United States Patent
Sasaki

(10) Patent No.: US 11,350,012 B2
(45) Date of Patent: May 31, 2022

(54) SCANNER FOR DISPLAYING AN AUTHENTICATION SCREEN WHEN AUTHENTICATION FAILED

(71) Applicant: BROTHER KOGYO KABUSHIKI KAISHA, Nagoya (JP)

(72) Inventor: Hiroyuki Sasaki, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 92 days.

(21) Appl. No.: 16/654,068

(22) Filed: Oct. 16, 2019

(65) Prior Publication Data

US 2020/0128149 A1 Apr. 23, 2020

(30) Foreign Application Priority Data

Oct. 18, 2018 (JP) .............................. JP2018-196925

(51) Int. Cl.
*H04N 1/00* (2006.01)
*H04N 1/44* (2006.01)
*H04L 9/40* (2022.01)

(52) U.S. Cl.
CPC ......... *H04N 1/4426* (2013.01); *H04L 63/083* (2013.01); *H04N 1/0097* (2013.01); *H04N 1/00209* (2013.01); *H04N 1/00244* (2013.01); *H04N 1/4413* (2013.01); *H04N 2201/0094* (2013.01)

(58) Field of Classification Search
CPC .. H04N 1/4426; H04N 1/0097; H04N 1/4413; H04N 1/4406
See application file for complete search history.

(56) References Cited

U.S. PATENT DOCUMENTS

| 2002/0087892 | A1* | 7/2002 | Imazu | .................. H04L 63/083 726/6 |
| 2014/0002847 | A1* | 1/2014 | Mizuno | .............. G06K 15/4095 358/1.14 |
| 2015/0156338 | A1 | 6/2015 | Terao | |
| 2016/0286084 | A1* | 9/2016 | Kawaguchi | ........ H04N 1/00344 |

(Continued)

FOREIGN PATENT DOCUMENTS

JP 2015-106815 A 6/2015

*Primary Examiner* — Benjamin O Dulaney
(74) *Attorney, Agent, or Firm* — Scully Scott Murphy and Presser

(57) ABSTRACT

A scanner may register one or more profile information to a memory, in a case where an operation for selecting specific profile information from among the one or more profile information registered to the memory is performed, send a first authentication request including first authentication information included in the specific profile information to the server, in a case where an authentication by the first authentication information fails in response to sending the first authentication request to the server, display an authentication information input screen, in a case where second authentication information is inputted in the authentication information input screen, send a second authentication request including the second authentication information to the server, and in a case where an authentication by the second authentication information is successful in response to sending the second authentication request to the server, send scan data to the server.

8 Claims, 7 Drawing Sheets

(56) References Cited

U.S. PATENT DOCUMENTS

| | | | |
|---|---|---|---|
| 2016/0316091 A1* | 10/2016 | Mori | H04N 1/2166 |
| 2017/0013170 A1* | 1/2017 | Sato | H04N 1/00413 |
| 2017/0162004 A1* | 6/2017 | Hughes | G06Q 20/326 |
| 2018/0183977 A1* | 6/2018 | Takasaki | H04N 1/4433 |
| 2018/0198926 A1 | 6/2018 | Terao | |
| 2018/0341759 A1* | 11/2018 | Sato | H04L 9/0894 |
| 2019/0220585 A1* | 7/2019 | Furuta | H04L 9/32 |

* cited by examiner

SCANNER FOR DISPLAYING AN AUTHENTICATION SCREEN WHEN AUTHENTICATION FAILED

CROSS-REFERENCE TO RELATED APPLICATION

This application claims priority to Japanese Patent Application No. 2018-196925 filed on Oct. 18, 2018, the contents of which are hereby incorporated by reference into the present application.

TECHNICAL FIELD

The disclosure herein discloses a technique related to a scanner configured to send scan data to a server.

DESCRIPTION OF RELATED ART

An MFP (abbreviation for Multifunction Peripheral) is known that is capable of sending image data with a folder in a file server set as a destination. Destination information indicating the destination of the image data is registered in the MFP. The destination information includes a folder path and authentication information (user name and password). In a case where the registered destination information is designated, the MFP accesses the folder by using the designated destination information, and sends, to the file server, image data obtained by reading an image on a document.

SUMMARY

In the above technique, there is no assumption that access to the server by using the registered destination information will fail. The present teachings provide a technique that is capable of storing scan data in a server even if access to the server by using profile information selected by a user fails.

A scanner disclosed herein may comprise: a scan executing unit; a processor; and a storage storing computer-readable instructions, wherein the computer-readable instructions, when executed by the processor, cause the scanner to: register one or more profile information to a memory, each of the one or more profile information including authentication information for a server capable of communicating with the scanner to authenticate a user; cause the scan executing unit to scan a document; in a case where an operation for selecting specific profile information from among the one or more profile information registered to the memory is performed on an operation unit, send a first authentication request including first authentication information included in the specific profile information to the server; in a case where an authentication by the first authentication information fails in response to sending the first authentication request to the server, cause a display unit to display an authentication information input screen for inputting authentication information different from the first authentication information; in a case where second authentication information is inputted in the authentication information input screen, send a second authentication request including the second authentication information to the server; and in a case where an authentication by the second authentication information is successful in response to sending the second authentication request to the server, send scan data obtained by the scan executing unit scanning the document to the server so as to store the scan data in the server.

Moreover, a scanner further disclosed herein may comprise: a scan executing unit; a processor; and a storage storing computer-readable instructions, wherein the computer-readable instructions, when executed by the processor, cause the scanner to: register one or more profile information to a memory, each of the one or more profile information including folder information indicating a folder in a server capable of communicating with the scanner; cause the scan executing unit to scan a document; in a case where an operation for selecting specific profile information from among the one or more profile information registered to the memory is performed on an operation unit, send a first access request including first folder information included in the specific profile information to the server; in a case where an access to a first folder indicated by the first folder information fails in response to sending the first access request to the server, cause a display unit to display a folder information input screen for inputting folder information different from the first folder information; in a case where second folder information is inputted in the folder information input screen, send a second access request including the second folder information to the server; and in a case where an access to a second folder indicated by the second folder information is successful in response to sending the second access request to the server, send scan data obtained by the scan executing unit scanning the document to the server so as to store the scan data in the second folder.

A computer program for implementing the above scanner and a non-transitory computer-readable medium storing the computer program for the scanner are also novel and useful. Moreover, a method carried out by scanner is also novel and useful.

BRIEF DESCRIPTION OF THE DRAWINGS

EMBODIMENTS (Configuration of Communication System 2; FIG. 1)
As shown in FIG. 1, a communication system 2 comprises a scanner 10, a server 100, and a terminal device 200. The devices 10, 100, 200 belong to a same LAN (abbreviation for Local Area Network) 4, and are capable of mutual communication via the LAN 4. The terminal device 200 is a portable terminal device such as a desktop PC (abbreviation for Personal Computer), laptop PC, tablet PC, or the like.

Figure 1:
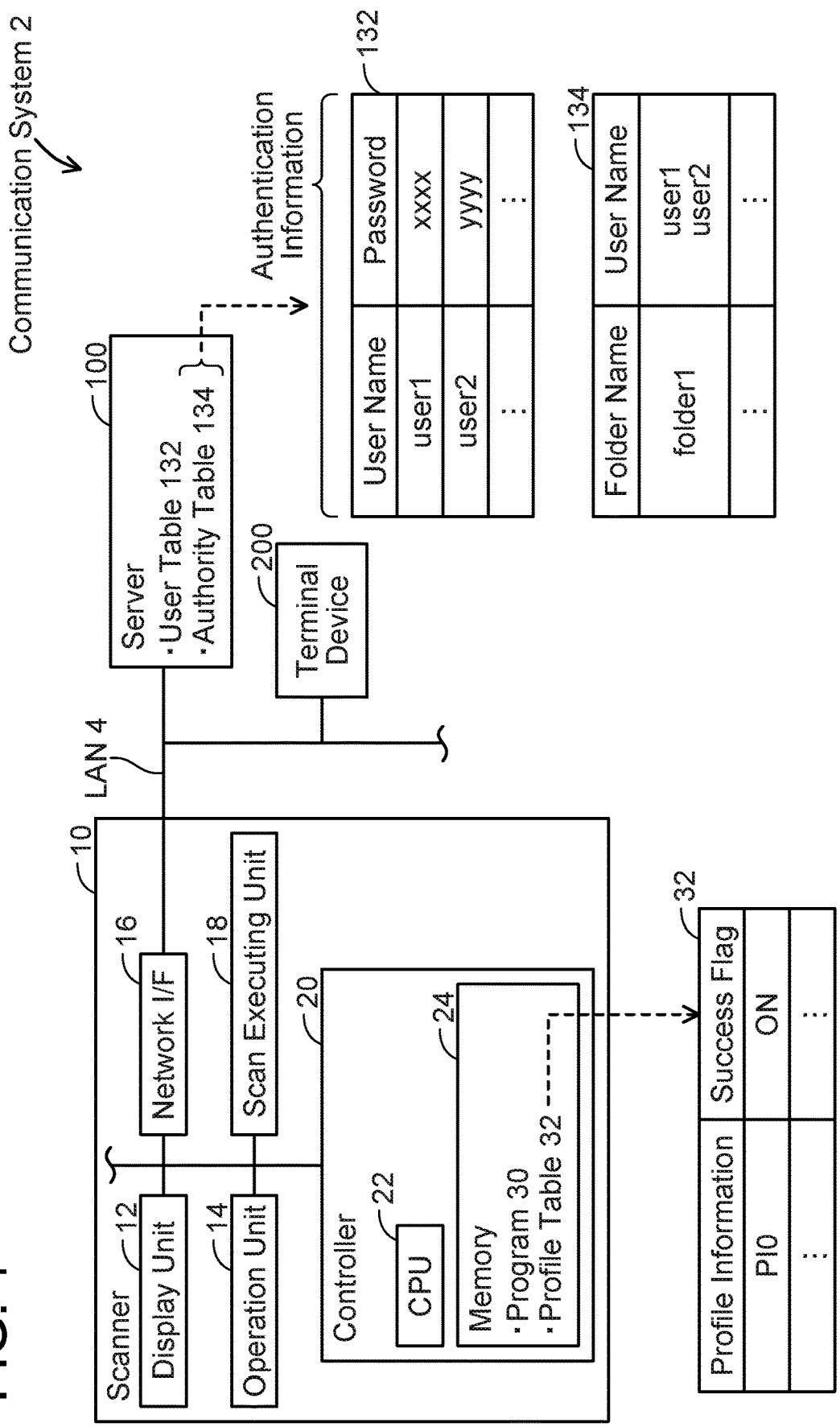
FIG. 1 shows a configuration of a communication system.

(Configuration of Scanner 10)
The scanner 10 is a peripheral device capable of executing a scan function (that is, a peripheral device of the terminal device 200, etc.). The scanner 10 comprises a display unit 12, an operation unit 14, a network interface 16, a scan executing unit 18, and a controller 20. The display unit 12 is a display for displaying various information. The display unit 12 may function as a so-called touch panel (that is, operation unit). The operation unit 14 comprises a plurality of keys. A user can input various instructions to the scanner 10 by operating the operation unit 14. The scan executing unit 18 comprises scan mechanism such as a CCD (abbreviation for Charge Coupled Device) image sensor, CIS (Contact Image Sensor), etc. Hereinbelow, interface is termed "I/F".

The network I/F 16 is an I/F for executing wired communication, and is connected with the LAN 4. In a variant, the network I/F 16 may be an I/F for executing wireless communication and, in this case, the LAN 4 is a so-called wireless LAN.

The controller 20 comprises a CPU 22 and a memory 24. The CPU 22 executes various processes in accordance with a program 30 stored in the memory 24. The memory 24 is configured by a volatile memory, a non-volatile memory, or the like. Further, the memory 24 stores a profile table 32.

The profile table 32 is a table for storing a plurality of items of profile information. The profile information indicates a profile for storing, in the server 100, scan data obtained by executing the scan function. The profile information includes a profile name, scan setting information for executing the scan function (e.g., data format, resolution, number of colors), a folder path indicating a folder in the server 100, and authentication information (that is, user name and password) for authenticating the user of the server 100. The profile information is registered in the profile table 32 by the user of the scanner 10.

For each of the plurality of items of profile information, the profile table 32 stores the profile information and a success flag in association with one another. The success flag indicates one of following values: "ON", indicating that there is a history of successful access to the server by using the corresponding profile information, and "OFF", indicating that there is no history of successful access to the server by using the corresponding profile information. Access to the server by using the profile information being successful means that authentication of the user by using the authentication information in the profile information succeeds, and also that access to the folder included in the folder path in the profile information succeeds.

(Configuration of Server 100)

The server 100 is a server for storing scan data received from the scanner 10. In a case where scan data is received from the scanner 10, the server 100 executes authentication of the user, and determination of whether the user has authority to access the folder. The server 100 stores a user table 132 used for authentication of the user, and an authority table 134 used for determination of whether the user has the authority to access.

The user table 132 is a table for registering authentication information. The authentication information includes user name(s) (e.g. "user1"), and password(s) (e.g. "xxxx"). The authentication information is registered in the user table 132 by an administrator of the server 100. The password may be changed after registration by the administrator or the user of the scanner 10.

The authority table 134 is a table for registering user name(s) of user(s) having authority to access a folder in the server 100. For each of a plurality of folders in the server 100, the authority table 134 stores a folder name of that folder (e.g. "folder1"), and a list of user name(s) of the user(s) having authority to access that folder (e.g. "user1, user2") in association with one another. The folder name is registered in the authority table 134 when the corresponding folder is created. The list of user name(s) is registered in the authority table 134 by the administrator of the server 100. The list of user name(s) in the authority table 134 may be changed after registration by the administrator.

Figure 2:
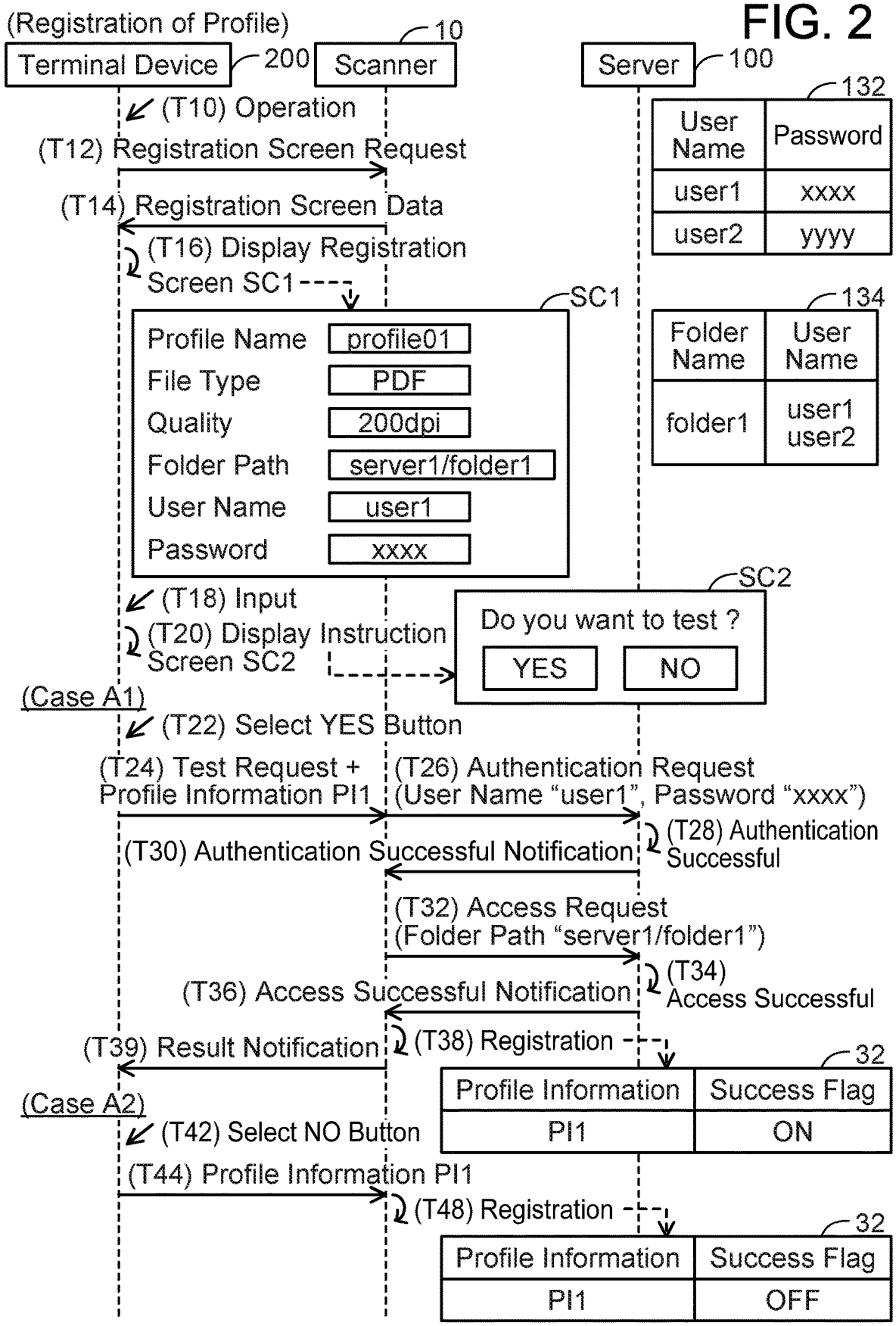
FIG. 2 shows a sequence view of a process for registering profile information.

(Process for Registering Profile Information; FIG. 2)

A process for registering the profile information in the profile table 32 in the scanner 10 will be described with reference to FIG. 2.

In T10, a predetermined operation for accessing the scanner 10 is executed on the terminal device 200 by the user. The predetermined operation includes, for example, a login operation for logging into the scanner 10 by authenticating the user who has authority to register the profile information. Upon receiving the predetermined operation in T10, the terminal device 200 sends a registration screen request to the scanner 10 in T12. The registration screen request is a command requesting registration screen data representing a registration screen for registering the profile information.

Upon receiving the registration screen request from the terminal device 200 in T12, the scanner 10 sends the registration screen data to the terminal device 200 in T14.

Upon receiving the registration screen data from the scanner 10 in T14, the terminal device 200 displays a registration screen SC1 represented by the registration screen data in T16. The registration screen SC1 includes an input field for inputting the profile information including the profile name, the scan setting information, the folder path, and the authentication information (that is, the user name and the password).

In T18, the user inputs, to the input field in the registration screen SC1, profile information PI1 including a profile name "profile1", scan setting information (e.g. data format "PDF", resolution "200 dpi"), a folder path "server1/folder1", and authentication information (i.e. user name "user1" and password "xxxx"). The folder path "server1/folder1" is configured by a host name "server1" of the server 100, and a folder name "folder1".

Upon receiving the input of the profile information PI1 in T18, the terminal device 200 displays an instruction screen SC2 in T20. For example, the registration screen SC1 includes a registration button (not shown). Then, in a case where the registration button is selected by the user after the input of the profile information PI1, the terminal device 200 displays the instruction screen SC2. The instruction screen SC2 is a screen for instructing on whether the scanner 10 is to test access to the server by using the authentication information and the folder path in the inputted profile. The instruction screen SC2 includes a YES button for receiving an instruction to test access to the server, and a NO button for receiving an instruction not to test access to the server.

In case A1, the user selects the YES button in the instruction screen SC2 in T22. Thereby, in T24 the terminal device 200 sends, to the scanner 10, a test request for causing the scanner 10 to test access to the server, and the profile information PI1 inputted in the registration screen SC1.

Upon receiving the test request and the profile information PI1 from the terminal device 200 in T24, the scanner 10 sends in T26, to the server 100, an authentication request including the authentication information (that is, the user name "user1" and the password "xxxx") included in the profile information PI1. The authentication request is a request for causing the server 100 to execute authentication of the user by using the authentication information. The authentication is, for example, basic authentication, digest authentication, Kerberos authentication, or the like.

Upon receiving the authentication request from the scanner 10 in T26, the server 100 executes authentication of the user in T28 by using the user name "user1" and the password "xxxx" included in the authentication request. Specifically, the server 100 specifies, from the user table 132, the password associated with the user name "user1" included in the authentication request. Then, the server 100 determines whether the specified password is identical to the password "xxxx" included in the authentication request. In the present case, the server 100 determines that the specified password "xxxx" is identical to the password "xxxx" included in the authentication request. As a result, in T28 the server 100 determines that authentication of the user has been successful. In T30, the server 100 sends, to the scanner 10, an authentication success notification for notifying that authentication of the user has been successful. In a case where it is determined that the specified password is not identical to the password "xxxx" included in the authentication request, the server 100 determines that the authentication of the user has failed. In this case, the server 100 sends, to the scanner 10, an authentication fail notification for notifying that the authentication of the user has failed. The authentication fail notification does not include information indicating a cause why the user authentication has failed (e.g. information indicating that the user name in the authentication request is not included in the user table 132, information indicating that the specified password is not identical to the password included in the authentication request).

Upon receiving the authentication success notification from the server 100 in T30, the scanner 10 sends in T32, to the server 100, an access request including the folder path "server1/folder1" included in the profile information PI1. The access request is a request for causing the server 100 to determine whether the user has the authority to access the folder indicated by the folder path.

Upon receiving the access request from the scanner 10 in T32, the server 100 determines in T34 whether the user has the authority to access the folder indicated by the folder path. Specifically, the server 100 specifies, from the authority table 134, a list of user name(s) associated with the folder name included in the folder path. Then, the server 100 determines whether the user name "user1" included in the profile information PI1 is included in the specified list. In the present case, the server 100 determines that the user name "user1" included in the profile information PI1 is included in the specified list. As a result, in T34 the server 100 determines that access to the folder "folder1" has been successful. In T36, the server 100 sends, to the scanner 10, an access success notification for notifying the scanner 10 that access to the folder "folder1" has been successful. In a case where it is determined that the user name "user1" included in the profile information PI1 is not included in the specified list, the server 100 determines that access to the folder "folder1" has failed. In this case, the server 100 sends, to the scanner 10, an access fail notification for notifying the scanner 10 that access to the folder "folder1" has failed.

Upon receiving the access success notification from the server 100 in T36, the scanner 10 registers the profile information PI1 in the profile table 32 in T38. Further, the scanner 10 determines that there is a history of successful access to the server by using the profile information PI1, and stores the success flag "ON" in association with the profile information PI1 in the profile table 32. In T39, the scanner 10 sends a result notification to the terminal device 200 indicating that access to the server by using the profile information PI1 has been successful. Contrary to this, in a case where the authentication fail notification or the access fail notification is received from the server 100, the scanner 10 sends, to the terminal device 200, a result notification indicating that access to the server by using the profile information PI1 has failed without registering the profile information PI1.

Further, in case A2, the user selects the NO button in the instruction screen SC2 in T42. Thereby, the terminal device 200 sends the profile information PI1 inputted in the registration screen SC1 to the scanner 10 in T44. It should be noted that, in the present case, the terminal device 200 does not send a test request to the scanner 10.

Upon receiving the profile information PI1 from the terminal device 200 in T44, the scanner 10 registers the profile information PI1 in the profile table 32 in T48. In the present case, due to the test request not being received from the terminal device 200, T26 to T36 of case A1 are not executed. As a result, the scanner 10 determines that there is no history of successful access to the server by using the profile information PI1, and stores the success flag "OFF" in the profile table 32 in association with the profile information PI1.

Further, it is also possible to change the profile information registered in the profile table 32 of the scanner 10 by operating the terminal device 200 as in FIG. 2. For example, upon receiving a predetermined operation, the terminal device 200 sends a profile list request to the scanner 10, and receives, from the scanner 10, a list of profile names of the profile information registered in the profile table 32. The terminal device 200 displays the list of profile names and, when one profile name is selected from the list of profile names, sends a change screen request including the authentication information to the scanner 10. The change screen request is a command for requesting authentication of the user by using the authentication information, and for requesting sending of change screen data representing a change screen for changing the profile information corresponding to the selected profile name. In a case where authentication of the user in response to the sending of the change screen request is successful, the terminal device 200 receives the change screen data from the scanner 10, and displays the change screen. The change screen includes a change field for changing respective information in the profile information corresponding to the selected profile name. For example, in a case where new authentication information is inputted to the change field in the change screen, the terminal device 200 sends the inputted new authentication information to the scanner 10. Upon receiving the inputted new authentication information from the terminal device 200, the scanner 10 registers the inputted new authentication information in the profile table 32 instead of the authentication information associated with the selected profile name in the profile table 32. Thereby, the authentication information is changed.

Figure 3:
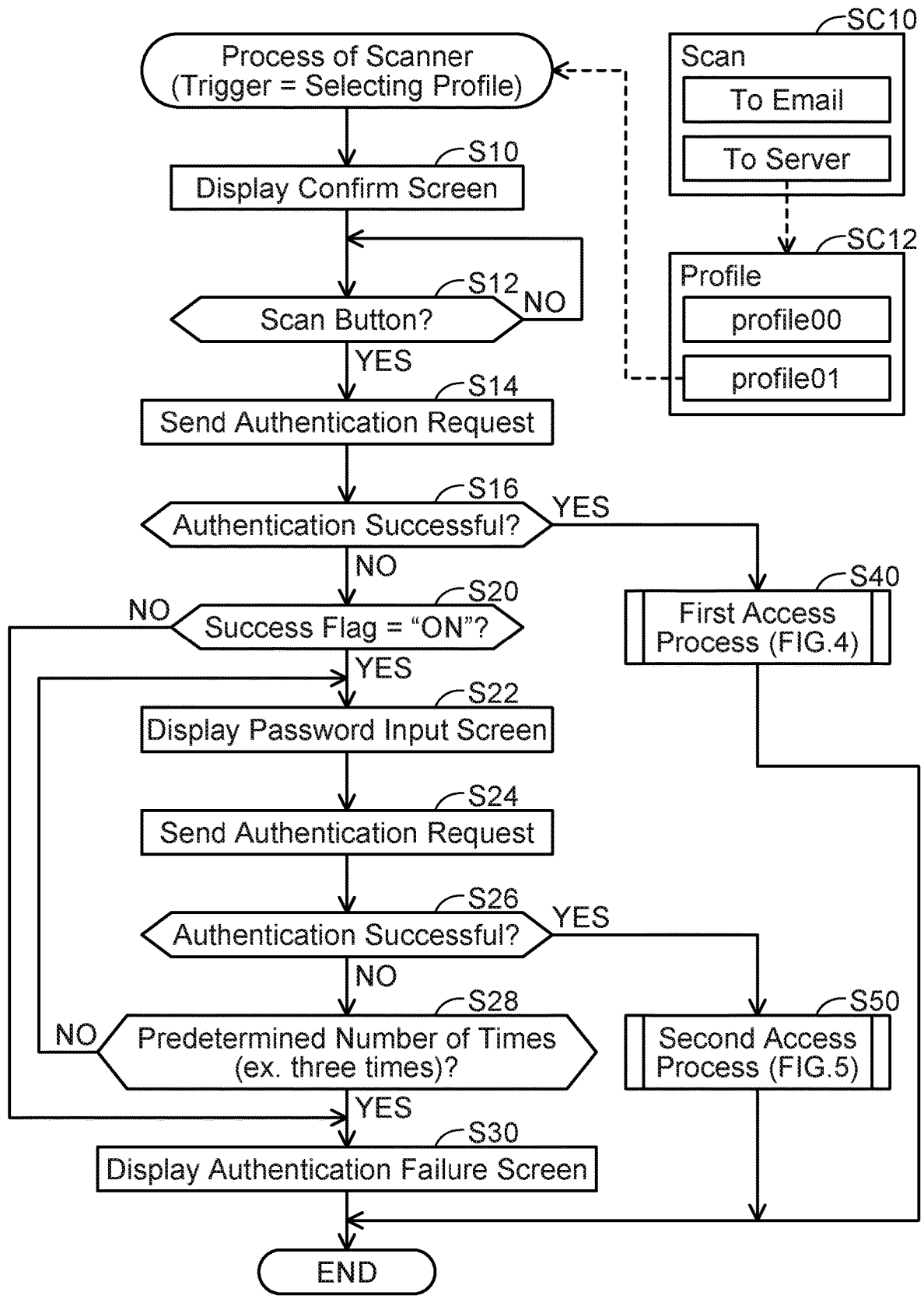
FIG. 3 shows a flowchart of a process executed by a scanner in a case where registered profile information is selected.

(Processes of Scanner; FIG. 3)

Contents of processes executed by the scanner 10 in a case where the registered profile information is selected will be described with reference to FIG. 3. The scanner 10 is capable of using various data communication methods (e.g. a method in which scan data is sent to a server, a method in which an e-mail having scan data attached thereto is sent). Upon accepting an operation for executing the scan function, the scanner 10 causes the display unit 12 to display a method selection screen SC10 for selecting one data communication method from among the various data communication methods. In a case where a To Server button indicating the method of sending the scan data to the server is selected in the method selection screen SC10, the scanner 10 causes the display unit 12 to display a profile selection screen SC12 for selecting one item of profile information from among the registered profile information. The processes of FIG. 3 are executed with the selection of one item of profile information (hereinbelow termed "specific profile information") in the profile selection screen SC12 as a trigger thereof.

In S10, the CPU 22 of the scanner 10 causes the display unit 12 to display a confirm screen SC14 (see FIG. 6) for causing the user to confirm contents of the specific profile information. The confirm screen SC14 includes character strings indicating contents of respective information in the specific profile information (e.g. the profile name, the scan setting information, the folder path, the user name), and a Scan button for receiving an instruction to execute the scan function. It should be noted that the confirm screen SC14 is capable of receiving an instruction for changing the scan setting information in the specific profile information.

In S12, the CPU 22 monitors selection of the Scan button in the confirm screen SC14. In a case where the Scan button in the confirm screen SC14 is selected (YES in S12), in S14 the CPU 22 sends an authentication request including the authentication information in the specific profile information to the server 100 via the network I/F 16. Thereby, the server 100 executes authentication of the user by using the authentication information in the specific profile information (see T26 to T30 of FIG. 2).

In S16, the CPU 22 determines whether authentication of the user by using the authentication information in the specific profile information has been successful. Specifically, the CPU 22 determines that the authentication of the user has been successful in the case of receiving an authentication success notification from the server 100, and determines that the authentication of the user has failed in the case of receiving an authentication fail notification from the server 100. In the case of determining that the authentication of the user has been successful (YES in S16), the CPU 22 executes a first access process in S40. Contents of the first access process will be described later with reference to FIG. 4. When the process of S40 ends, the processes of FIG. 3 end.

Further, in the case of determining that the authentication of the user has failed (NO in S16), in S20 the CPU 22 specifies the success flag associated with the specific profile information from the profile table 32. Then, the CPU 22 determines whether the specified success flag indicates "ON". In case of determining that the specified success flag indicates "OFF" (NO in S20), the CPU 22 skips S22 to S28, described later, and proceeds to S30. On the other hand, in case of determining that the specified success flag indicates "ON" (YES in S20), the CPU 22 proceeds to S22.

Figure 6:
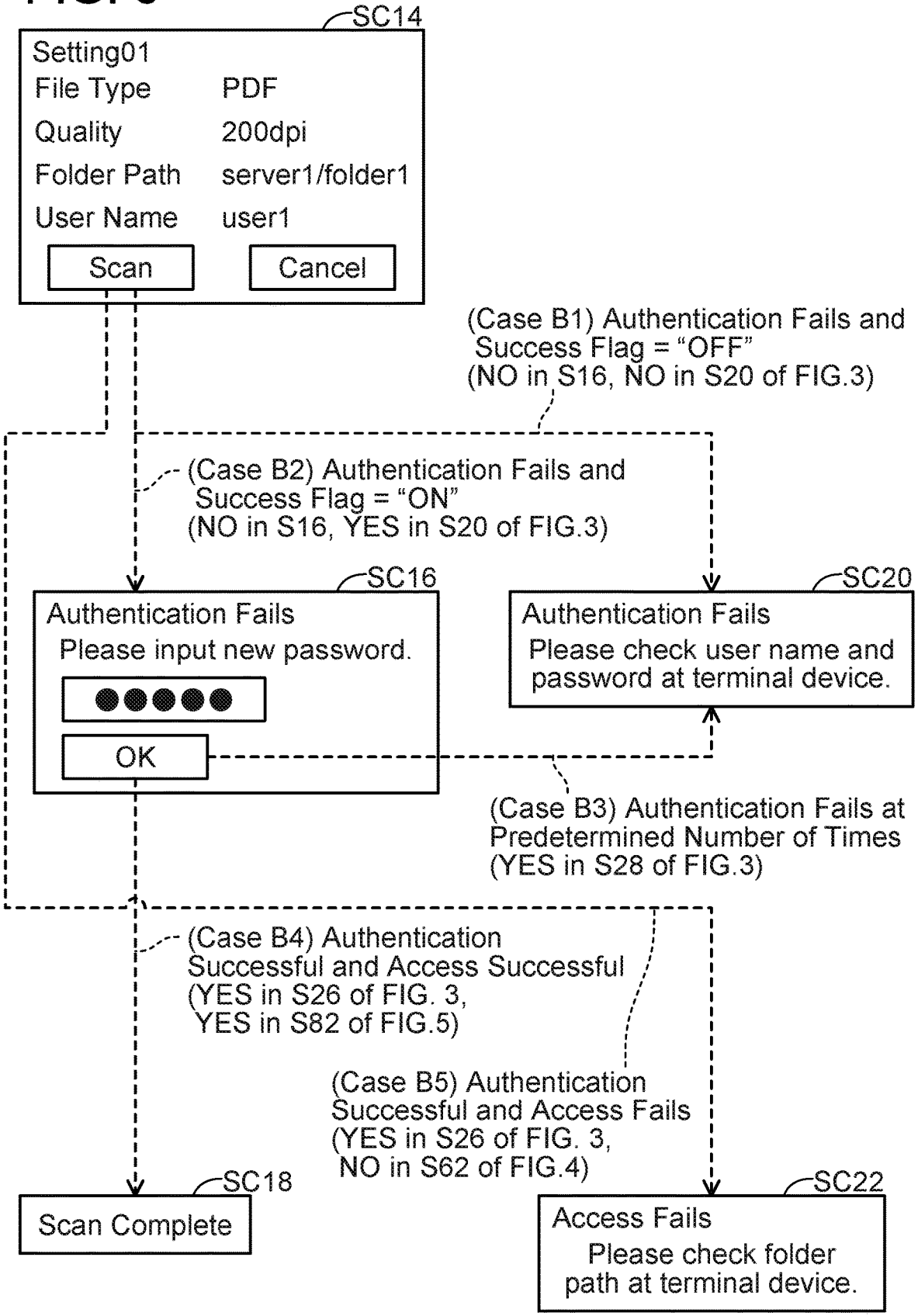
FIG. 6 shows screens displayed on the scanner.

In S22, the CPU 22 causes the display unit 12 to display a password input screen SC16 (see FIG. 6). The password input screen SC16 is a screen for inputting the password. For example, in a case where the password registered in the user table 132 of the server 100 is changed after the specific profile information has been registered in the profile table 32 of the scanner 10, the server 100 fails to authenticate the user by using the authentication information in the specific profile information. For example, the server 100 periodically requests the user to change the password in order to prevent a decrease in security. The user changes the password in the user table 132 of the server 100 in response to the request from the server 100. However, thereafter the user may forget to change the password in the profile table 32 of the scanner 10. In such a situation, the password in the user table 132 is changed after the registration of the specific profile information, and the authentication of the user by using the authentication information in the specific profile information fails. A changed password different from the password in the specific profile information is inputted in the password input screen SC16. Thereby, it is possible to cause the server 100 to authenticate the user by using the changed password.

In S24, the CPU 22 sends an authentication request including the user name in the specific profile information and the password inputted in the password input screen SC16 to the server 100 via the network I/F 16. S26 is similar to S16. In case of determining that authentication of the user has been successful (YES in S26), the CPU 22 executes a second access process in S50. Contents of the second access process will be described later with reference to FIG. 5. When the process of S50 ends, the processes of FIG. 3 end.

Further, in case of determining that the authentication of the user has failed (NO in S26), in S28 the CPU 22 determines whether an authentication request including the password inputted in the password input screen SC16 has been sent a predetermined number of times (e.g. three times) or more. In case of determining that the authentication request including the password inputted in the password input screen SC16 has not been sent the predetermined number of times or more (NO in S28), the CPU 22 returns to S22, and causes the display unit 12 to display the password input screen SC16 again.

Further, in case of determining that the authentication request including the password inputted in the password input screen SC16 has been sent the predetermined number of times or more (YES in S28), in S30 the CPU 22 causes the display unit 12 to display an authentication failure screen SC20 (see FIG. 6). The authentication failure screen SC20 is a screen for notifying that authentication by means of the authentication information has failed. The authentication failure screen SC20 includes a message for prompting the user to change the authentication information by using the terminal device 200. Thereby, the user can operate the terminal device 200 to change the authentication information in the profile information registered in the profile table 32. When S30 ends, the processes of FIG. 3 end.

Figure 4:
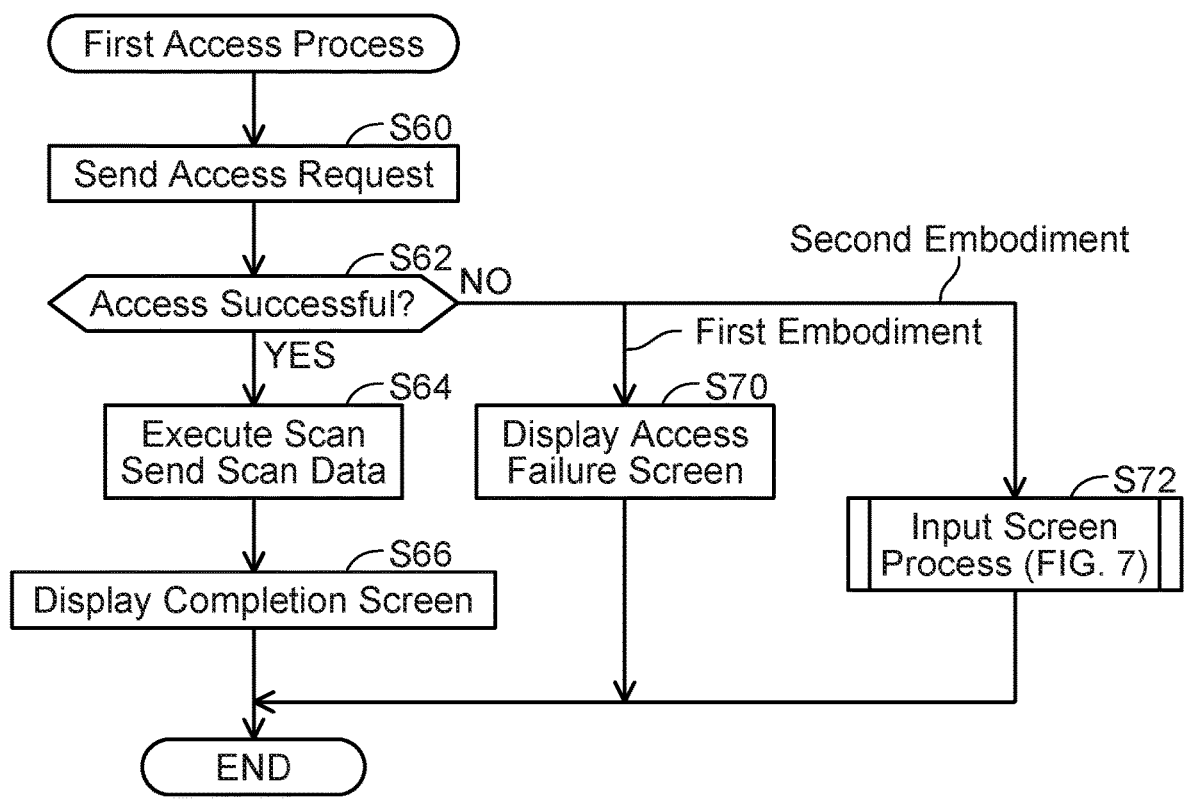
FIG. 4 shows a flowchart of a first access process.

(First Access Process; FIG. 4)

The contents of the first access process will be described with reference to FIG. 4. In S60, the CPU 22 sends an access request including the folder path in the specific profile information to the server 100 via the network I/F 16. Thereby, the server 100 determines whether the user has the authority to access the folder indicated by the folder path in the specific profile information (see T32 to T36 of FIG. 2).

In S62, the CPU 22 determines whether access to the folder indicated by the folder path in the specific profile information has been successful. Specifically, the CPU 22 determines that access to the folder has been successful in the case of receiving an access success notification from the server 100, and determines that access to the folder has failed in the case of receiving an access fail notification from the server 100. In case of determining that access to the folder has been successful (YES in S62), the CPU 22 proceeds to S64. In S64, the CPU 22 causes the scan executing unit 18 to scan a document, creating scan data. Then, the CPU 22 sends the created scan data to the server 100 via the network I/F 16 with the folder path in the specific profile information as the destination. Thereby, the created scan data is stored in the folder indicated by the folder path in the specific profile information.

In S66, the CPU 22 causes the display unit 12 to display a completion screen SC18 (see FIG. 6) indicating that the storage of the scan data is completed. When S66 ends, the processes of FIG. 4 end.

Further, in case of determining that access to the folder has failed (NO in S62), the CPU 22 proceeds to S70. In S70, the CPU 22 causes the display unit 12 to display an access failure screen SC22 (see FIG. 6). The access failure screen SC22 is a screen for notifying that access to the folder indicated by the folder path has failed. The access failure screen SC22 includes a message prompting the user to change the folder path by using the terminal device 200. Thereby, the user can operate the terminal device 200 to change the folder path in the profile information registered in the profile table 32. When S70 ends, the processes of FIG. 4 end.

Figure 5:
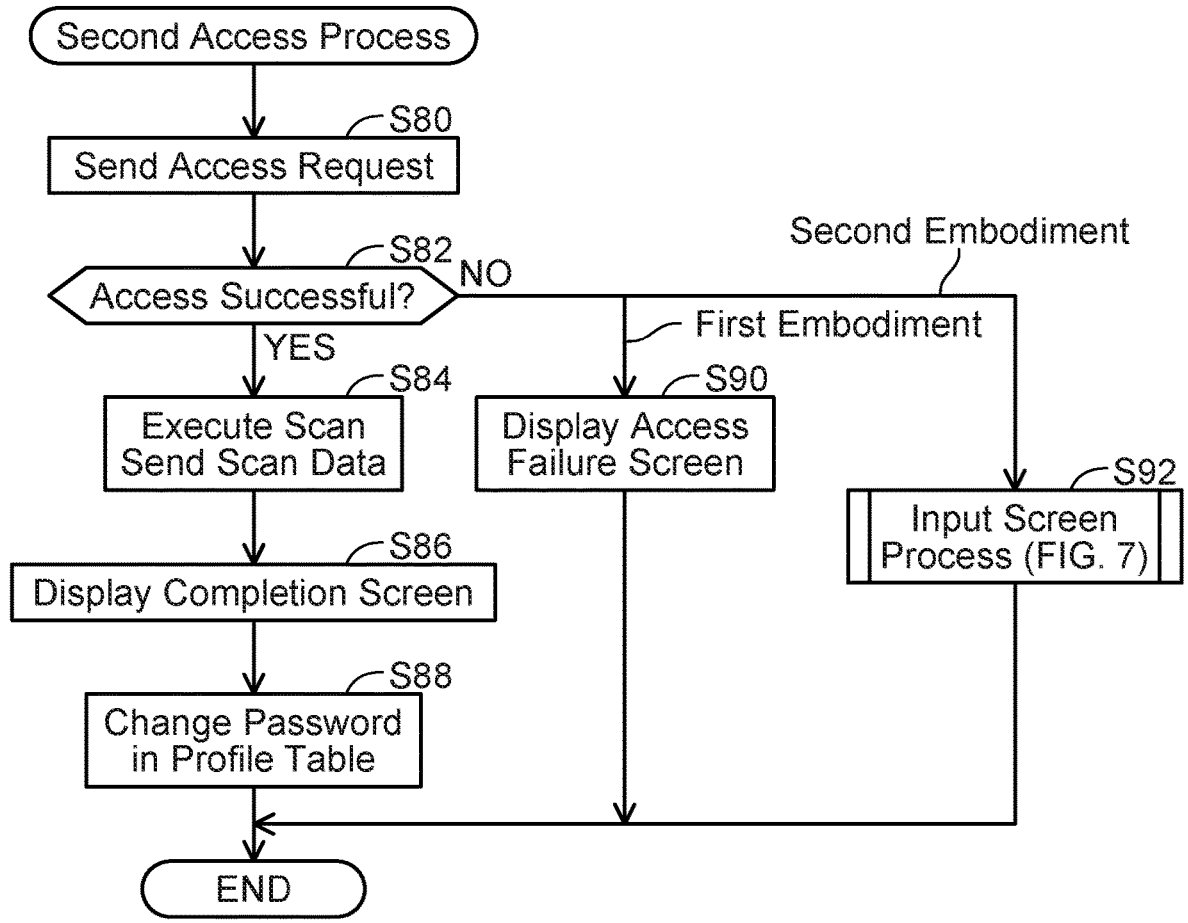
FIG. 5 shows a flowchart of a second access process.

(Second Access Process; FIG. 5)

The contents of the second access process will be described with reference to FIG. 5. S80 to S86, S90 are similar to S60 to S66, S70 of FIG. 4. In S88, the CPU 22 changes the password associated with the profile name in the specific profile information in the profile table 32 to the password inputted in the password input screen SC16. When S88 or S90 ends, the processes of FIG. 5 end.

(Specific Cases; FIG. 6)

Specific cases realized by the processes of FIG. 3 to FIG. 5 will be described with reference to FIG. 6. In each case described later, the profile information PI1 is selected as the specific profile information.

In case B1, in the processes of FIG. 2, the NO button in the instruction screen SC2 is selected in the case where the profile information PI1 is registered (case A2 of FIG. 2). As a result, in the profile table 32, the success flag "OFF" is stored in association with the profile information PI1 (T48). Further, in the present case, it is assumed that the profile information PI1 includes authentication information different from the correct authentication information (that is, the user name "user1", the password "xxxx").

In case B1, when the Scan button is selected in the confirm screen SC14, the scanner 10 sends an authentication request including the authentication information in the profile information PI1 to the server 100 (S14 of FIG. 3). Due to the authentication information in the profile information PI1 being different from the correct authentication information, the scanner 10 determines that the authentication of the user by using the authentication information in the profile information PI1 has failed (NO in S16 of FIG. 3). Then, the scanner 10 determines that the success flag associated with the profile information PI1 indicates "OFF" (NO in S20). As a result, the scanner 10 displays the authentication failure screen SC20. The success flag "OFF" means that there is no history of successful access to the server by using the authentication information in the profile information PI1. Therefore, failure to authenticate the user by using the authentication information in the profile information PI1 may mean that not only the password in the authentication information in the profile information PI1, but also the user name is incorrect. In such a case, the scanner 10 displays the authentication failure screen SC20 without displaying an input screen including an input field for inputting the authentication information (that is, the user name, the password). Thereby, the user can be prompted to operate the terminal device 200 in order to change the authentication information in the profile information PI1.

In case B2, in the processes of FIG. 2, the YES button in the instruction screen SC2 is selected in the case where the profile information PI1 is registered (case A1 of FIG. 2). As a result, the success flag "ON" is stored in association with the profile information PI1 in the profile table 32 (T38). Further, in the present case, after the profile information PI1 has been registered, the password corresponding to the user name "user1" in the user table 132 of the server 100 is changed from the password "xxxx" to a password "zzzz".

In case B2, due to the password "xxxx" in the profile information PI1 being different from the changed password "zzzz", the scanner 10 determines that the authentication of the user by using the authentication information in the profile information PI1 has failed (NO in S16 of FIG. 3). Then, the scanner 10 determines that the success flag associated with the profile information PI1 indicates "ON" (YES in S20). As a result, the scanner 10 displays the password input screen SC16 (S22 of FIG. 3). Here, the password input screen SC16 does not include an input field for inputting the user name but includes a password input field for inputting a password. The success flag "ON" means that there is a history of successful access to the server by using the authentication information in the profile information PI1. Therefore, the failure to authenticate the user by using the authentication information in the profile information PI1 means that there is a high possibility that the password in the user table 132 may have been changed after the registration of the profile information PI1. That is, this means that there is a high possibility that the user name could be correct and the password could be different in the authentication information in the profile information PI1. In the present case, the scanner 10 can display the password input screen SC16 including an appropriate input field that is suitable for the situation in which the password has been changed.

Case B3 is a continuation of case B2. In the present case, due to the user inputting an incorrect instruction in the operation unit 14 of the scanner 10, or the like, a password different from the changed password "zzzz" is inputted in the password input screen SC16. As a result, the scanner 10 determines that the authentication of the user has failed (NO in S26 of FIG. 3). Then, the scanner 10 again displays the password input screen SC16 (S22 which went to NO in S28). In the present case, the user twice inputs a password different from the changed password "zzzz" in the password input screen SC16 that is displayed again. As a result, the scanner 10 determines that the authentication of the user has failed, and determines that the authentication request has been sent three times or more, which is the predetermined number of times (YES in S28). Then, the scanner 10 displays the authentication failure screen SC20. Thereby, the user can be notified of a method of operating the terminal device 200 which is a method other than operation of the operation unit 14 in the scanner 10, as a method for changing the password in the profile information PI1. For example, when the terminal device 200 is operated to change the password in the profile information PI1, a login operation for logging in to the scanner 10 is executed on the terminal device 200. Therefore, in the case where the authentication request has been sent the predetermined number of times or more, by notifying the user of a method including the login operation, it is possible to prevent the password in the profile information PI1 from being changed by a user who does not have the authority to log in to the scanner 10.

Case B4 is a continuation of case B2. In the present case, the changed password "zzzz" is inputted in the password input screen SC16. As a result, the scanner 10 determines that the authentication of the user has been successful (YES in S26 of FIG. 3). The scanner 10 sends an access request including the folder path "server1/folder1" in the profile information PI1 to the server 100 (S80 of FIG. 5). Due to the user name "user1" in the profile information PI1 being stored in association with the folder name "folder1" in the authority table 134 (see FIG. 1), the scanner 10 determines that access to the folder has been successful (YES in S82).

As a result, the scanner 10 sends the scan data to the server 100 (S84), and displays the completion screen SC18 (S86).

In the present case, the scanner 10 displays the password input screen SC16 in the case where an authentication by the profile information PI1 fails. Thereby, the user can input the password "zzzz" that is different from the password "xxxx". For this reason, the scanner 10 can send an authentication request including the password "zzzz" to the server and, in a case where an authentication by the authentication information including the user name "user1" and the password "zzzz" is successful, the scanner 10 can store the scan data in the server 100.

Further, in the present case, the scanner 10 displays the password input screen SC16 in the case where the authentication by the profile information PI1 fails. That is, the user does not need to operate the terminal device 200, which is different from the scanner 10, in order to change the password in the profile information PI1. Therefore, convenience for the user is improved. In the present embodiment, the user can operate the terminal device 200 to change the profile information. For example, the keys in the operation unit 14 of the scanner 10 are smaller than the keys in the operation unit of the terminal device 200 and, further, the display unit 12 of the scanner 10 is smaller than the display unit of the terminal device 200. Therefore, the user finds it more troublesome to operate the scanner 10 than to operate the terminal device 200. For this reason, taking operability for the user into consideration, it is preferable to have the user operate the terminal device 200 in the case where the authentication by the profile information PI1 fails. However, in this case, if the authentication by the profile information PI1 fails after the user has operated the scanner 10 and selected the profile information, the user must shift from the scanner 10 to the terminal device 200, operate the terminal device 200 to input the password, then again shift from the terminal device 200 back to the scanner 10, and operate the scanner 10 and select the profile information. Although operability for the user is not reduced, convenience for the user is reduced. By contrast, in the present case, the user does not need to shift between the terminal device 200 and the scanner 10, and therefore convenience for the user is improved.

Further, in the present case, in the case where the authentication by the profile information PI1 fails, the scanner 10 displays the password input screen SC16 without displaying a screen for accepting an operation for selecting profile information different from the profile information PI1 from among the registered one or more profile information. That is, the user can store the scan data in the server 100 even without performing an operation for selecting profile information different from the profile information PI1.

In case B5, after the profile information PI1 has been registered, the user name "user1" is deleted from the list of user names associated with the folder name "folder1" in the authority table 134 of the server 100. In the present case, the scanner 10 determines that authentication of the user by using the authentication information in the profile information PI1 has been successful (YES in S16 of FIG. 3). The scanner 10 sends an access request including the folder path "server1/folder1" in the profile information PI1 to the server 100 (S60 of FIG. 4). Since the user name "user1" in the profile information PI1 is not being stored in association with the folder name "folder1" in the authority table 134, the scanner 10 determines that access to the folder has failed (NO in S62 of FIG. 4). Then, the scanner 10 displays the access failure screen SC22. For example, a comparative example is assumed in which, in the case where it is determined that access to the folder has failed, a screen including an input field for inputting a folder path is displayed. As described above, the keys in the operation unit 14 of the scanner 10 are smaller than the keys in the operation unit of the terminal device 200. Further, in the terminal device 200, the user can operate an operation unit such as a mouse, etc. to copy a folder path and input it in the input field. For this reason, in the configuration of the comparative example, the user finds it more troublesome to operate the scanner 10 than to operate the terminal device 200. By contrast, in the present case, the scanner 10 displays the access failure screen SC22 without displaying a screen including an input field. Thereby, the user can be notified, as a method for changing the folder path in the profile information PI1, of a method of operating the terminal device 200, which is a method other than operation of the operation unit 14 in the scanner 10. In a variant, the configuration of the comparative example described above may be adopted. Further, as above, at the time of operating the terminal device 200 to change the password in the profile information PI1, the login operation for logging into the scanner 10 is performed on the terminal device 200. Therefore, in the case where access to the folder has failed, by notifying the user of a method including the login operation, it is possible to prevent the folder path in the profile information PI1 from being changed by the user who does not have the authority to login to the scanner 10.

(Correspondence Relationship)

The scanner 10, the server 100, the terminal device 200 are an example of "a scanner", "a server", "a terminal device", respectively. The display unit 12, the operation unit 14, the scan executing unit 18, the memory 24 are an example of "a display unit", "an operation unit", "a scan executing unit", "a memory", respectively. The profile information in the profile table 32 is an example of "one or more profile information". The authentication request of S14 of FIG. 3 and the authentication request of S24 of FIG. 3 are an example of "a first authentication request", "a second authentication request", respectively. The password input screen SC16 of FIG. 6 and the password input field in the password input screen SC16 of FIG. 6 are an example of "an authentication information input screen", "a password input field", respectively. Selection of the YES button in the instruction screen SC2 in T22 of FIG. 2 is an example of "a predetermined instruction". The success flag "ON" is an example of "predetermined information". The authentication failure screen SC20 displayed in S30 which went to NO in S20 of FIG. 3 is an example of "a first authentication failure screen". The authentication failure screen SC20 displayed in S30 which went to YES in S28 of FIG. 3 is an example of "a second authentication failure screen". The folder path is an example of "folder information". The access request in S60 of FIG. 4 is an example of "a first access request". The access failure screen SC22 of FIG. 6 is an example of "an access failure screen".

T38 or T48 of FIG. 2 is an example of "register one or more profile information". S14, S22, S24 of FIG. 3 are an example of "send a first authentication request", "cause a display unit to display an authentication information input screen", "send a second authentication request", respectively. S84 of FIG. 5 is an example of "cause the scan executing unit to scan a document and send scan data".

Second Embodiment

The present embodiment is similar to the first embodiment except for a point that the contents of the first access process and the second access process are different. Hereinbelow, the contents of the first access process and the second access process of the present embodiment will be described.

(First and Second Access Processes; FIG. 4, FIG. 5)

In the first access process of the present embodiment, in case of determining that access to the folder has failed (NO in S62 of FIG. 4), the CPU 22 executes an input screen process in S72. When the process of S72 ends, the first access process ends. Further, in the second access process of the present embodiment, in case of determining that access to the folder has failed (NO in S82 of FIG. 5), the CPU 22 executes an input screen process in S92. When the process of S92 ends, the second access process ends. Contents of the input screen process will be described later with reference to FIG. 7.

Figure 7:
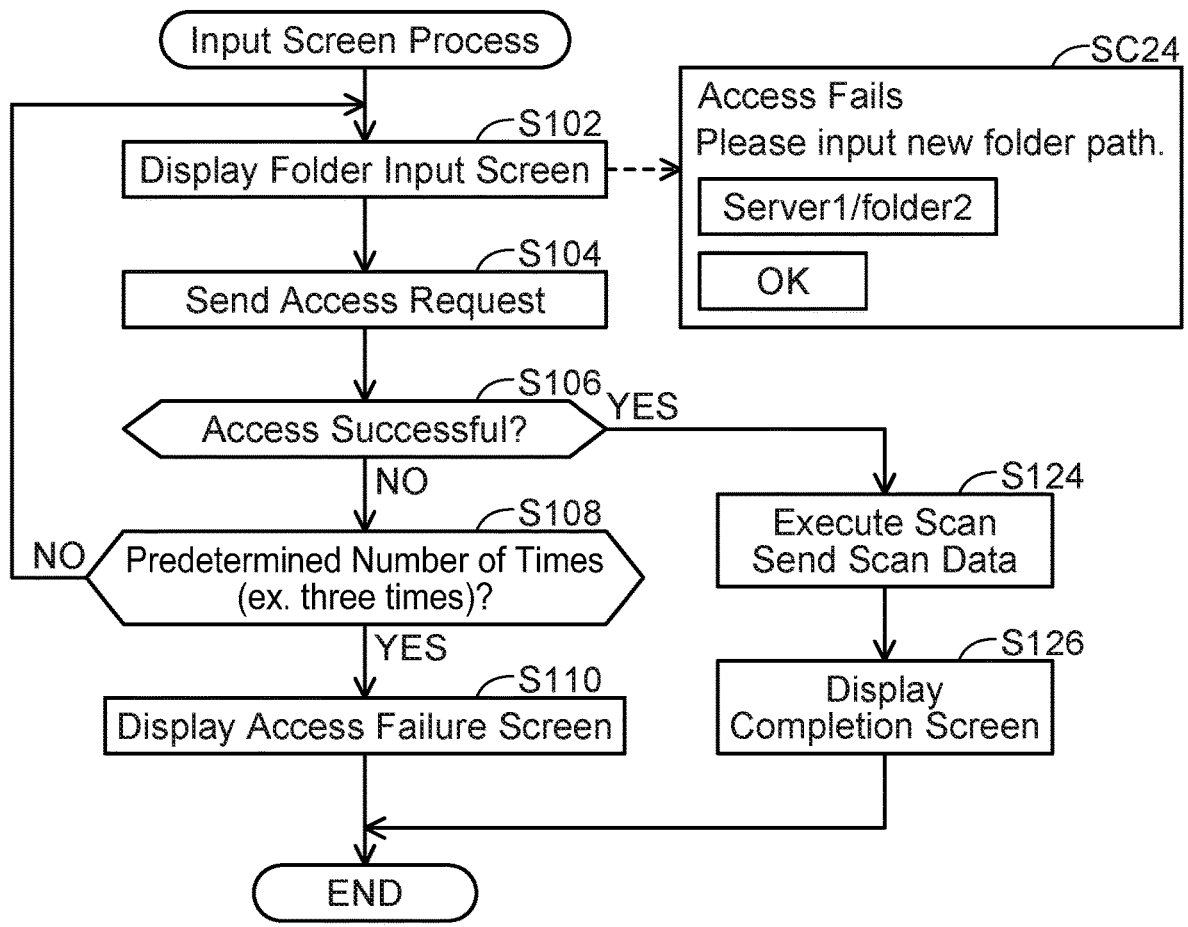
FIG. 7 shows a flowchart of an input screen process of a second embodiment.

(Input Screen Process; FIG. 7)

The contents of the input screen process will be described with reference to FIG. 7. In S102, the CPU 22 causes the display unit 12 to display a folder input screen SC24. The folder input screen SC24 is a screen for inputting a folder path. For example, there may be a case where, after the specific profile information has been registered, the user name in the specific profile information is deleted from the list of user name(s) associated with the folder name in the specific profile information in the authority table 134 of the server 100, or a case where server down is occurring temporarily. In these cases, access to the folder indicated by the folder path in the specific profile information fails. A folder path different from the folder path in the specific profile information can be input in the folder input screen SC24. Thereby, it is possible to cause the server to execute determination as to whether or not the user has the authority to access the folder indicated by the inputted folder path.

S104 is similar to S60 of FIG. 4 except for a point that the folder path inputted in the folder input screen SC24 is included in the access request. S106 is similar to S62 of FIG. 4. In case of determining that access to the folder has been successful (YES in S106), the CPU 22 proceeds to S124, S126. S124, S126 are similar to S64, S66 of FIG. 4. When S126 ends, the processes of FIG. 7 end.

Further, in case of determining that access to the folder has failed (NO in S106), in S108 the CPU 22 determines whether the access request including the folder path inputted in the folder input screen SC24 has been sent a predetermined number of times (e.g. three times) or more. In case of determining that the access request including the folder path inputted in the folder input screen SC24 has not been sent the predetermined number of times (NO in S108), the CPU 22 returns to S102, and causes the display unit 12 to display the folder input screen SC24 again.

Further, in case of determining that the access request including the password inputted in the folder input screen SC24 has been sent the predetermined number of times or more (YES in S108), the CPU 22 proceeds to S110. S110 is similar to S70 of FIG. 4. When S110 ends, the processes of FIG. 7 end.

According to the present embodiment, in the case where access to the folder indicated by the folder path in the specific profile information fails (S62 of FIG. 4), the scanner 10 displays the folder input screen SC24 (S72 of FIG. 4, S102 of FIG. 7). Thereby, the user can input a folder path different from the folder path in the specific profile information. For this reason, the scanner 10 can send, to the server 100, a folder request including the folder path inputted in the folder input screen SC24 and, in a case where access to the folder indicated by the inputted folder path is successful (YES in S106), the scanner 10 can cause the scan data to be stored in the folder indicated by the inputted folder path (S124).

Further, according to the present embodiment, in case of determining that access to the folder indicated by the inputted folder path has been successful (YES in S106), the scanner 10 executes the processes of S124, S126, and ends the input screen process. That is, the scanner 10 ends the input screen process without changing the folder path associated with the profile name in the specific profile information in the profile table 32 to the folder path inputted in the folder input screen SC24. For example, a comparative example is assumed in which the folder path in the profile table 32 is changed to the inputted folder path in the case where it is determined that access to the folder indicated by the inputted folder path has been successful. For example, a case is assumed in which specific profile information is selected by a user different from the user indicated by the user name in the specific profile information. In this case, when access to the folder indicated by the folder path in the specific profile information fails, the different user can input a folder path in the folder input screen SC24. As a result, the folder path in the profile table 32 can be changed to a folder path inputted by the different user. By contrast, in the present embodiment, the folder path in the profile table 32 is not changed to the inputted folder path. Thereby, it is possible to prevent the folder path in the profile table 32 from being changed to a folder path inputted by a different user.

(Correspondence Relationship)

The access request of S60 of FIG. 4 is an example of "a first access request". The folder input screen SC24 of FIG. 7 is an example of "a folder information input screen". The access request of S104 of FIG. 7 is an example of "a second access request".

S60 of FIG. 4 is an example of "send a first access request". S102, S104 of FIG. 7 are an example of "cause a display unit to display a folder information input screen", "send a second access request", respectively. S124 of FIG. 7 is an example of "cause the scan executing unit to scan a document and send scan data".

Specific examples of the present invention are described above in detail, but these examples are merely illustrative and place no limitation on the scope of the patent claims. The technology described in the claims also encompasses various changes and modifications to the specific examples described above. Some of variants of the above embodiments are listed below.

(Variant 1) "A scanner" may not be the scanner 10, but may be, for example, a multifunction peripheral capable of executing a scan function.

(Variant 2) "Profile information" may not include the scan setting information. "Profile information" may need to include at least the authentication information.

(Variant 3) The process of S88 of FIG. 5 may not be executed. In this variant, "change the first authentication information" may be omitted.

(Variant 4) The profile table 32 may not store the success flag. In that case, the process of S20 of FIG. 3 may not be executed. In this variant, "store predetermined information" may be omitted. Further, in this variant, in S22 the scanner 10 may further display an authentication information input screen including an input field for inputting a user name, and a password input field. Thereby, when the profile information PI1 is registered in case A2 of FIG. 2, it is possible to input correct authentication information in a case where the authentication information in the profile information PI1 is incorrect. In this variant, "an authentication information input screen" may include an input field for inputting a user name different from the first user name included in the first authentication information.

(Variant 5) The process of S28 of FIG. 3 may not be executed. In this variant, "cause the display unit to display the authentication information input screen again", "send a fourth authentication request", "cause the display unit to display a second authentication failure screen" may be omitted.

(Variant 6) "Profile information" may not include a folder path. In that case, instead of the processes of S40, S50 of FIG. 3, a process similar to S64 of FIG. 4 may be executed. In this variant, "profile information" may not have to include folder information, and "send a first access request", "cause the display unit to display an access failure screen" may be omitted.

(Variant 7) In the second embodiment, S20 to S28, S50 of FIG. 3 may not be executed. In this variant, the "scanner" may simply need to comprise "register one or more profile information", "cause the scan executing unit to scan a document", "send a first access request", "cause a display unit to display a folder information input screen", "send a second access request", and "send scan data".

(Variant 8) In the second embodiment, in a case where it is determined that access to the folder indicated by the folder path inputted in the folder input screen SC24 has been successful, the scanner 10 may change the folder path in the profile table 32 to the inputted folder path.

(Variant 9) "An operation unit", "a display unit" may be disposed in a terminal device (e.g. the terminal device 200) capable of communicating with the scanner 10. In this case, for example, the terminal device 200 accesses the scanner 10 in response to an operation of the user, and displays a list of profile name(s) in the profile table 32. Then, in a case where one profile name in the list of profile name(s) is selected, the terminal device 200 causes the scanner 10 to send an authentication request by using the authentication information in the specific profile information corresponding to the selected profile name. Then, in a case where authentication using the authentication information in the specific profile information fails, the terminal device 200 receives screen data representing a password input screen from the scanner 10, and displays the password input screen. In the present case, the user does not need to operate a device other than the terminal device 200 in the case where authentication using the authentication information in the specific profile information fails. Convenience for a user is improved.

(Variant 10) The processes of FIG. 2 may not be executed. For example, the profile information may be registered in the profile table 32 by operating the operation unit of the scanner 10. In this variant, "receive the specific profile information" may be omitted.

(Variant 11) "A predetermined instruction" is not restricted to selection of the YES button of T22 of FIG. 2, but may be, for example, selection of the profile information PI1 in the profile selection screen SC12 after case A2 of FIG. 2. In this case, if the access to server by using the profile information PI1 is successful (YES in S16 of FIG. 3, YES in S62 of FIG. 4), the scanner 10 may store the success flag "ON" in the profile table 32 in association with the profile information PI1.

(Variant 12) In each of the above embodiments, the respective processes of FIG. 2 to 7 are implemented by the CPU 22 of the scanner 10 executing the program 30 (that is, software). Instead of this, one or more of the processes may be implemented by hardware such as a logic circuit.

What is claimed is:

1. A scanner comprising:
a scan executing unit;
a processor; and
a storage storing computer-readable instructions, wherein the computer-readable instructions, when executed by the processor, cause the scanner to:
register one or more profile information to a memory, each of the one or more profile information including authentication information for a server capable of communicating with the scanner to authenticate a user;
in a case where a predetermined instruction is received, send a third authentication request including first authentication information to the server;
in a case where the authentication by the first authentication information is successful in response to sending the third authentication request to the server, store predetermined information in the memory;
cause the scan executing unit to scan a document;
in a case where an operation for selecting specific profile information from among the one or more profile information registered to the memory is performed on an operation unit, send a first authentication request including the first authentication information included in the specific profile information to the server;
in a case where an authentication by the first authentication information fails in response to sending the first authentication request to the server and the predetermined information is stored in memory, cause a display unit to display an authentication information input screen for inputting authentication information different from the first authentication information;
in a case where second authentication information is inputted in the authentication information input screen, send a second authentication request including the second authentication information to the server;
in a case where an authentication by the second authentication information is successful in response to sending the second authentication request to the server, send scan data obtained by the scan executing unit scanning the document to the server so as to store the scan data in the server; and
in a case where the authentication by the first authentication information fails in response to sending the first authentication request to the server and the predetermined information is not stored in the memory, cause the display unit to display a first authentication failure screen for notifying that the authentication by the first authentication information has failed, the first authentication failure screen not including an input field for inputting authentication information different from the first authentication information.

2. The scanner as in claim 1, wherein
the computer-readable instructions, when executed by the processor, further cause the scanner to:
change the first authentication information included in the specific profile information to the second authentication information in the case where the authentication by the second authentication information is successful in response to sending the second authentication request to the server.

3. The scanner as in claim 1, wherein
the authentication information includes a user name and a password,
the authentication information input screen includes a password input field for inputting a password different from a first password included in the first authentication information, the authentication information input screen does not include an input field for inputting a user name different from a first user name included in the first authentication information, and the second authentication information includes the first user name and a second password inputted in the password input field.

4. The scanner as in claim 1, wherein
the computer-readable instructions, when executed by the processor, further cause the scanner to:

in a case where the authentication by the second authentication information fails in response to sending the second authentication request to the server, cause the display unit to display the authentication information input screen again;

in a case where third authentication information is inputted in the authentication information input screen displayed again, send a fourth authentication request including the third authentication information to the server; and in a case where an authentication by the third authentication information fails in response to sending the fourth authentication request to the server, cause the display unit to display a second authentication failure screen for notifying that the authentication by the third authentication information has failed, the second authentication failure screen not including an input field for inputting authentication information different from the third authentication information.

5. The scanner as in claim 1, wherein
each of the one or more profile information further includes folder information indicating a folder in the server, and the computer-readable instructions, when executed by the processor, further cause the scanner to:

in a case where the authentication by the first authentication information is successful in response to sending the first authentication request to the server, send a first access request including first folder information included in the specific profile information to the server; and in a case where an access to a first folder indicated by the first folder information fails, cause the display unit to display an access failure screen for notifying that the access to the first folder has failed, the access failure screen not including a folder input field for inputting folder information different from the first folder information.

6. The scanner as in claim 1, further comprising the operation unit and the display unit.

7. The scanner as in claim 1, wherein
the computer-readable instructions, when executed by the processor, further cause the scanner to:

in a case where the specific profile information is inputted in a terminal device capable of communicating with the scanner, receive the specific profile information from the terminal device, and the specific profile information is registered in the memory in a case where the specific profile information is received from the terminal device.

8. A non-transitory computer-readable medium storing computer-readable instructions for a scanner, wherein the scanner comprises a scan executing unit, and
the computer-readable instructions, when executed by a processor of the scanner, cause the scanner to:

register one or more profile information to a memory, each of the one or more profile information including authentication information for a server capable of communicating with the scanner to authenticate a user;

in a case where a predetermined instruction is received, send a third authentication request including first authentication information to the server;

in a case where the authentication by the first authentication information is successful in response to sending the third authentication request to the server, store predetermined information in the memory;

cause the scan executing unit to scan a document;

in a case where an operation for selecting specific profile information from among the one or more profile information registered to the memory is performed on an operation unit, send a first authentication request including first authentication information included in the specific profile information to the server;

in a case where an authentication by the first authentication information fails in response to sending the first authentication request to the server and the predetermined information is stored in the memory, cause a display unit to display an authentication information input screen for inputting authentication information different from the first authentication information;

in a case where second authentication information is inputted in the authentication information input screen, send a second authentication request including the second authentication information to the server;

in a case where an authentication by the second authentication information is successful in response to sending the second authentication request to the server, send scan data obtained by the scan executing unit scanning the document to the server so as to store the scan data in the server; and in a case where the authentication by the first authentication information fails in response to sending the first authentication request to the server and the predetermined information is not stored in the memory, cause the display unit to display a first authentication failure screen for notifying that the authentication by the first authentication information has failed, the first authentication failure screen not including an input field for inputting authentication information different from the first authentication information.

* * * * *

UNITED STATES PATENT AND TRADEMARK OFFICE
CERTIFICATE OF CORRECTION

| | | |
|---|---|---|
| PATENT NO. | : 11,350,012 B2 | Page 1 of 1 |
| APPLICATION NO. | : 16/654068 | |
| DATED | : May 31, 2022 | |
| INVENTOR(S) | : Hiroyuki Sasaki | |

It is certified that error appears in the above-identified patent and that said Letters Patent is hereby corrected as shown below:

On the Title Page

Item (54) and in the Specification, Column 1, Lines 1-3 should read:
SCANNER FOR DISPLAYING AN AUTHENTICATION SCREEN WHEN AN AUTHENTICATION FAILED Signed and Sealed this
Twenty-second Day of October, 2024

Katherine Kelly Vidal
*Director of the United States Patent and Trademark Office*